Sept. 15, 1936.                G. W. LEIGHTON                2,054,260
                                EGG GRADING SCALE
                                Filed Feb. 1, 1936
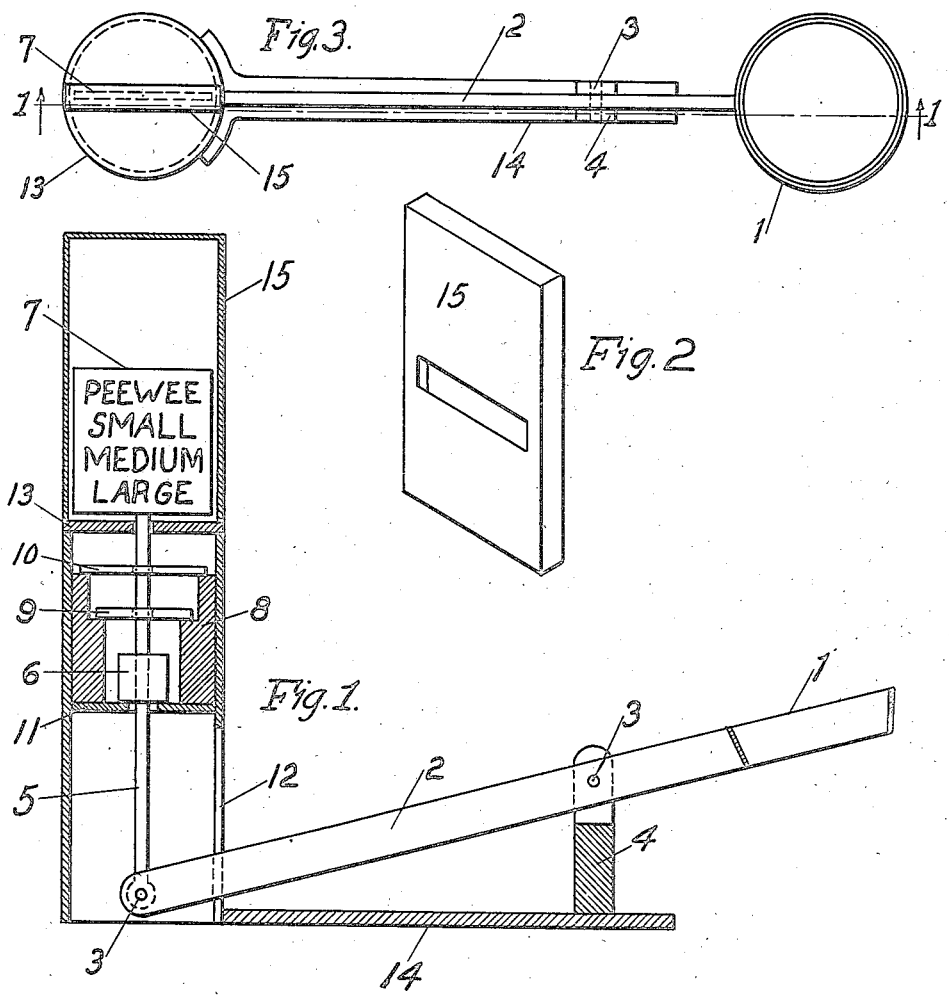
Inventor
George W. Leighton Patented Sept. 15, 1936

2,054,260

UNITED STATES PATENT OFFICE 2,054,260

EGG GRADING SCALE

George W. Leighton, Los Angeles, Calif.

Application February 1, 1936, Serial No. 61,978

1 Claim. (Cl. 265—48)

The invention relates to improvements in egg-grading scales, in which a computing device is arranged, dispensing with the handling of weights, and eliminating fluctuation of dial or indicator; and the objects of the improvements are, first, to provide a dial that computes the different sizes of eggs, corresponding to standard egg weights; second, to record the sizes of eggs instantly and accurately, by their respective names on the dial; and third, to save time by eliminating the handling of weights and fluctuation of dial or indicator.

I attain these objects by mechanism illustrated in the accompanying drawing, in which Figure 1 is a vertical section of part of the scale on the line 1, 1, Fig. 3; Figure 2, a detailed view in perspective of the dial housing; and Figure 3, a plan view of the scale.

A tapered egg receptacle 1 is connected to balance beam 2, which is connected by pin 3 to post 4; end of balance beam 2 is connected by pin 3 to vertical rod 5, to which is attached weight 6 and dial 7; circular form 8 supports disc weight 9 through which rod 5 slides, another disc weight 10, through which 5 slides, rests on top of 8; the support for weight 6 and form 8 through which 5 passes, is 11. Tubular housing 12, to which is attached cap 13, acts as guide to vertical rod 5. A plate 14, connects 12 and 4.

Encasing dial 7, and attached to top of guide 13, is vertical housing 15 (see Fig. 2), with horizontal slot where various sizes of eggs are indicated by their respective names, as per the following description:

When an egg weighing less than 1¼ ounces is placed in 1, it is not of sufficient weight to raise 6 and 7, so it would indicate Peewee in the slot of 15, in Figure 2; an egg placed in 1, weighing 1¼ ounces to $1\frac{7}{12}$ ounces will raise 6 up to 9, and dial 7 rises the same distance, and Small would be indicated in slot of 15; when an egg weighing $1\frac{7}{12}$ ounces to 1⅝ ounces is placed in 1, it causes 6 to lift 9 to 10, and dial 7 is raised to indicate Medium in slot of 15; an egg weighing over 1⅝ ounces placed in 1, causes 6 to lift 9 and 10 to the guide 13, and dial 7 is raised to indicate Large in slot of 15. When any size egg is removed from 1, then 6, 7, 9 and 10 instantly fall back to original position, as per drawing (see Fig. 1).

The space between any two weights and the space between the top weight and the guide is the same as the space occupied by each word on the dial.

I am aware that prior to my invention egg-grading scales have been made with various combination weights. I therefore do not claim such a combination broadly; but

I claim:

In an egg grading scale, the combination of a vertical sliding rod with a dial having names thereon attached at the top thereof, a weight attached to the vertical rod, disc weights having holes therein, through which said rod passes, and supported on a form independent of said rod and spaced apart the same distance as the names on said dial; whereby, when an egg is placed on the scale, the different weights are raised from the form in accordance with the weight of the egg, the corresponding name being indicated on the dial.

GEORGE W. LEIGHTON.